United States Patent Office 3,494,784
Patented Feb. 10, 1970

3,494,784
METHOD OF OBTAINING DRY, NON-ADHESIVE ELASTOMER-BASED SOLID PRODUCTS
Robert De Coene, Etterbeek, Brussels, and Francois Lardinoit, Schaerbeek, Brussels, Belgium, assignors to Solvay & Cie, Brussels, Belgium, a corporation of Belgium
No Drawing. Filed Apr. 13, 1967, Ser. No. 630,535
Claims priority, application Netherlands, Apr. 21, 1966, 6605349; Oct. 18, 1966, 6614634
Int. Cl. C08d 7/00, 9/08; B44d 1/22
U.S. Cl. 117—100                              4 Claims

ABSTRACT OF THE DISCLOSURE

Elastomer-based solid product in the form of a dry, non-adhesive powder which does not conglomerate when stored is obtained by coagulating an elastomer-based latex, coagulating with the coagulate thus obtained a small amount of a hard polymer, and washing and drying the coagulated solid product resulting from the second coagulation.

BACKGROUND OF THE INVENTION

The present invention relates to a process for obtaining elastomer-based solid products, in the form of a non-adhesive dry powder which does not conglomerate when stored and to the products so obtained.

Elastomers to which the invention is particularly applicable are vinyl acetate-ethylene copolymers containing 45 to 95% by weight of vinyl acetate, polybutadienes, copolymers of butadiene with one or more monomers such as styrene, acrylonitrile and methyl methacrylate, and polymers of substituted butadienes such as isoprene, for example, polyisoprene, and chlorobutadienes, for example, neoprene. These elastomers are generally used for the coating of various bases. Moreover, they are excellent macromolecular additives which when incorporated in small quantities with certain resins result in resins which have better processability and shaped products constituted of which are improved, particularly with respect to impact resistance.

These elastomers are usually available in the form of aqueous latices. For certain applications, the latices may be used as is. For other applications, however, it is desirable first to separate the solid product. In such a case, a major problem has been encountered. Specifically, when the latex is coagulated, by the addition of an electrolyte while the latex is being agitated, for example, the precipitated elastomer conglomerates when the agitation is stopped or when it is separated from the aqueous phase as by draining or when it is subsequently dried after separation and washing.

For other applications, it is particularly useful to have available mixtures of the elastomers with other polymers or copolymers. Such an application is, for example, the preparation of impact-resistant resins which may subsequently be shaped into impact-resistant articles by conventional molding and extrusion techniques. Simply mixing the solid products generally is not satisfactory because, in most cases, there are thereby obtained compositions which are difficult to gell and which, after gelling, due to the incompleteness of the gelling, are heterogeneous. The use of these mixtures results in articles lacking transparency and having relatively poor mechanical properties. In order to obtain homogeneous compositions, the elastomer and the other polymer or copolymer are mixed in the form of their respective latices. If the proportion of elastomer is relatively large, the above mentioned problem is again encountered. Namely, the coagulated product conglomerates at the time of draining or drying or, at the least, when stored.

SUMMARY OF THE INVENTION

According to the present invention, the foregoing problem is overcome and there are obtained elastomer-based solid products in the form of non-adhesive dry powders which do not conglomerate when stored. In further accordance with the invention, there is provided a method for obtaining these products, which method comprises coagulating a latex of an elastomer-based solid while agitating the latex, the elastomer-based solid containing 30 to 100% by weight of elastomer and the balance non-elastomeric polymer (the term "polymer" including copolymers), and then adding to the resultant coagulate a relatively small quantity of a latex of a hard polymer, while agitating the coagulate, permitting the latex of the hard polymer to coagulate on the former coagulate, separating the resultant solid product from the aqueous phase and washing and drying the solid product.

DESCRIPTION OF THE PREFERRED EMBODIMENTS

The elastomers of the elastomer-based products to the latices of which the present invention is particularly applicable are mentioned above in the discussion of the background of the invention. Among non-elastomeric polymers which may additionally be incorporated in the initial latex polyvinyl chloride is particularly noteworthy.

Particularly preferred hard polymers which may be coagulated onto the initial coagulate are polyvinyl chloride, polystyrene and polymethyl methacrylate. In some cases, 0.5% by weight, based on the weight of the solid resin contained in the initial latex, of the hard polymer is sufficient to obtain the desired result. In other cases, it may be necessary to use up to 25% by weight of hard polymer. Generally, 5% by weight suffices. More than 25% by weight of hard polymer may be coagulated onto the initial coagulate to ultimately obtain a non-adhesive dry powder which does not conglomerate when stored, but this is disadvantageous because the resultant mixture of the elastomer-based resin and hard polymer is less homogeneous, particularly due to heterogeneity of the grains of the powder. Moreover, the addition of large quantities of hard polymer can also be undesirable if one wishes to have a final product having essentially the inherent properties of the elastomer employed.

Application of the invention to latices of elastomer-based products in which the elastomer is a vinyl acetate-ethylene copolymer containing less than 45% or more than 95% by weight of vinyl acetate is superfluous whatever the proportion of the copolymer in these products. By conventional coagulation and subsequent draining, washing and drying there is obtained, without difficulty, a dry, non-adhesive powder which does not conglomerate when stored.

It is also superfluous to apply the invention to latices of elastomer-based solid products in which the elastomer constitutes less than about 30% by weight of the solid product, because, again, the desired result is attained by conventional coagulating, draining, washing and drying. However, when the proportion of the elastomer is above about 30% by weight, if the method of the invention is not employed the coagulated product conglomerates at the time of draining or drying or after a certain period of storage. For example, when the solid of the initial latex contains 30 to 40% by weight of a vinyl acetate-ethylene copolymer containing 45 to 95% of vinyl acetate, conventional coagulating results in a finely divided powder which conglomerates after a certain period of storage; when the proportion of the vinyl acetate-ethylene copolymer is from 40 to 50%, the same problem occurs at the time of drying the solid product; and when the proportion of the vinyl acetate-ethylene copolymer is over 50%, the coagulated particles conglomerate into a sticky product at the time of draining.

The dry, non-adhesive solid products obtained according to the present invention can readily be incorporated with other resins in order to provide resins of modified properties, particularly improved impact resistance. For example, products obtained according to the present invention can be added to polyvinyl chloride, copolymers of vinyl chloride, post-chlorinated polyvinyl chloride, polystyrene and the like; the resultant powders readily gell, are homogeneous and are easily worked.

Furthermore, according to the present invention there may be obtained dry, non-adhesive powders which may be used as is, constituted of from 40 to 60% by weight of a vinyl acetate-ethylene copolymer in which the proportion of vinyl acetate is 45 to 95% based on the weight of the copolymer and having coagulated or deposited on it a hard polymer according to the invention and from 60 to 40% by weight (i.e., the balance) of polyvinyl chloride, which powders readily gell into a homogeneous product similar to a plasticized polymer.

Any coagulation technique is suitable for the method of the present invention. For example, the initial latex can be caused to flow into an aqueous solution of an electrolyte such as calcium chloride or aluminum sulfate, while the solution is being agitated. In some cases, it is necessary to provide milling apparatus. Latices very rich in neoprene, for example, do not coagulate as floccules or flakes and, to overcome this problem, a milling apparatus is employed during the initial coagulation to reduce the coagulate into small pieces as it forms.

Generally, it is preferable not to interrupt the agitation between the initial coagulation and the second coagulation in which the hard polymer is coagulated onto the initial coagulate. At the time of the second coagulation, it is not necessary to replenish the coagulant solution and, accordingly, the operation may simply amount to permitting the hard polymer latex to flow into the medium of the initial coagulation. Between the initial and second coagulations, part of the aqueous phase may be separated off such as by draining but such a step is not of any particular consequence.

The invention will now be further illustrated by reference to the following examples. Examples 2 to 6, 8, 9, 14 to 21, 24, 25, 27, 28, 31, 32, 34, 36, 38 and 40 are within the scope of the invention. Examples 1, 7, 10, 11, 12, 13, 22, 23, 26, 29, 30, 33, 35, 37, and 39 are outside the scope of the invention and are intended only for purposes of comparison.

In Examples 1 to 22, the coagulations are conducted in a three liter beaker equipped with an agitator and three-quarters immersed in a thermostatic bath. The coagulant solution is constituted of 4.4 g. of $Al_2(SO_4)_3 \cdot 16H_2O$ crystals dissolved in 1,334 g. of water. In each of these examples, there is obtained 300 g. of dry powder per kg. of the latex.

In Examples 23 to 40, the coagulations are conducted in a 30 liter tank equipped with an agitator. The coagulant solution is constituted of 80 g. of

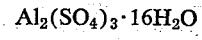

dissolved in 6,667 g. of water.

Into the agitated coagulant solution at ambient temperature, there is permitted to flow a latex of a vinyl acetate-ethylene copolymer the vinyl acetate content of which is 67% by weight and the K value of which measured in cyclohexanone at 20° C. is 90. The electrolyte coagulates the latex in the form of floccules whereby there is obtained a suspension of subdivided copolymer. When the agitation is stopped, the floccules adhere to each other, and when the suspension is drained the copolymer conglomerates into a mass.

EXAMPLE 2

Into the agitated coagulant solution at ambient temperature, there is allowed to flow 633 g. of a latex containing 190 g. of a vinyl acetate-ethylene copolymer the vinyl acetate content of which is 67% by weight and the K value of which measured in cyclohexanone at 20° C. is 90. Then there is introduced 33 g. of a latex containing 10 g. of a polyvinyl chloride. There is obtained suspension of floccules which are not at all adhesive. Upon draining, the product is quite powdery and may be washed without difficulty.

EXAMPLE 3

Into the agitated coagulant solution at 70° C. there is allowed to flow 633 g. of a latex containing 190 g. of a vinyl acetate-ethylene copolymer the vinyl acetate content of which is 47% by weight and the K value of which measured in cyclohexanone at 20° C. is 60. Then, there is introduced 33 g. of a latex containing 10 g. of polyvinyl chloride. There is thus formed a suspension of floccules. The suspension is agitated at 70° C. for 30 minutes. Upon draining, the floccules do not adhere to each other and the product remains quite powdery and is easily washable.

EXAMPLE 4

Into the agitated coagulant solution at ambient temperature there is allowed to flow 633 g. of a latex containing 190 g. of a vinyl acetate-ethylene copolymer the vinyl acetate content of which is 67% by weight and the K value of which measured in cyclohexanone at 20° C. is 90. The size of the resultant particles or floccules is 1 to 5 mm. Then, there is introduced 19 g. of a latex containing 5.7 g. of a polyvinyl chloride. The floccules of the final product thus formed do not adhere to each other, and, upon draining, the product stays quite powdery and can be washed without difficulty.

EXAMPLE 5

This example is carried out like the former example whereby the vinyl acetate-ethylene copolymer floccules obtained are 1 to 5 mm. in size. However, only a third of the quantity of the polyvinyl chloride latex introduced in the former example is introduced in this example. The floccules do not adhere to each other and they can be drained and washed without any conglomeration occurring.

EXAMPLE 6

This example is like Examples 4 and 5 but the quantity of the polyvinyl chloride latex introduced is only one-half that introduced in Example 5. The floccules do not adhere to each other and may be drained and washed without any conglomeration occurring.

EXAMPLE 7

This example is carried out in the same manner as Examples 4 to 6 but the quantity of the polyvinyl chloride latex introduced is only that quantity containing 0.20 g. of the polyvinyl chloride. This time the floccules adhere to each other and conglomerate upon draining.

EXAMPLE 8

Into the agitated coagulant solution at ambient temperature there is allowed to flow 633 g. of a latex containing 190 g. of a vinyl acetate-ethylene copolymer the vinyl acetate content of which is 93% by weight and the K value of which measured in cyclohexanone at 20° C. is 120. Then, there is introduced 33 g. of a latex containing 10 g. of a polystyrene. There is thus obtained a suspension of non-adhesive floccules. Upon draining, the product remains quite powdery and may be washed without difficulty.

EXAMPLE 9

This example is exactly like Example 8 but the polymer of the second latex is polymethyl methacrylate rather than polystyrene. The results are equally favorable.

EXAMPLE 10

Into the agitated coagulant solution at ambient temperature there is allowed to flow a latex mixture containing 60 g. of vinyl acetate-ethylene copolymer the vinyl acetate content of which is 67% by weight and the K value of which measured in cyclohexanone at 20° C. is 90 and 140 g. of a polyvinyl chloride. The latex mixture coagulates upon contact with the electrolyte to form a suspension of floccules. The floccules may be easily drained, washed and dried. However, after a relatively short time the floccules conglomerate into a mass.

EXAMPLE 11

This example is like Example 10 but the latex mixture contains 80 g. of the vinyl acetate-ethylene copolymer and 120 g. of the polyvinyl chloride. The resultant floccules may be easily drained but conglomerate at the time of drying.

EXAMPLE 12

This example is like Examples 10 and 11 but the latex mixture contains 100 g. of the vinyl acetate-ethylene copolymer and 100 g. of the polyvinyl chloride. The floccules conglomerate at the time of draining to form a sticky mass which is not easily washed or dried.

EXAMPLE 13

This example is like Examples 10 to 12 but the latex mixture contains 50 g. of the vinyl acetate-ethylene copolymer and 150 g. of the polyvinyl chloride. The suspension of floccules may be easily drained, washed and dried. The resultant fine powder when stored remains in a subdivided state without any conglomeration.

EXAMPLE 14

Into the agitated coagulant solution at ambient temperature there is allowed to flow a latex mixture containing 60 g. of a vinyl acetate-ethylene copolymer the vinyl acetate content of which is 67% by weight and the K value of which measured is cyclohexanone at 20° C. is 90 and 130 g. of a polyvinyl chloride. Then, after coagulation of this mixture, there is introduced a quantity of a latex containing 10 g. of a polyvinyl chloride. There is thus obtained a suspension of floccules which remain quite powdery when the suspension is drained and which can then be washed and dried without difficulty. The resultant fine powder upon storage remains in a subdivided state without any conglomeration.

EXAMPLE 15

This example is like Example 14 but the latex mixture contains 80 g. of the vinyl acetate-ethylene copolymer and 100 g. of the polyvinyl chloride. The floccules obtained may be treated as in Example 14 and the resultant powder may be stored without any conglomeration occurring.

EXAMPLE 16

This example is like Examples 14 and 15 but the latex mixture contains 100 g. of the vinyl acetate-ethylene copolymer and 90 g. of the polyvinyl chloride. The floccules obtained may be treated as in Examples 14 and 15 and the resultant powder may be stored without any conglomeration occurring.

EXAMPLE 17

This example is like Examples 14 to 16 but the latex mixture contains 150 g. of the vinyl acetate-ethylene copolymer and 40 g. of the polyvinyl chloride. The results are equally favorable.

EXAMPLE 18

Into the agitated coagulant solution at a temperature of 70° C. there is allowed to flow a latex mixture containing 100 g. of a vinyl acetate-ethylene copolymer the vinyl acetate content of which is 47% by weight and the K value of which measured in cyclohexanone at 20° C. is 60 and 90 g. of a polyvinyl chloride. Then, after coagulation of this mixture, there is introduced a latex containing 10 g. of a polyvinyl chloride. The resultant suspension of floccules is agitated at 70° C. for 30 minutes. Upon draining, it is found that the floccules are not adhesive and the product stays quite powdery. The product may be washed and dried without difficulty. The resultant fine powder does not conglomerate when it is stored.

EXAMPLE 19

Into the agitated coagulant solution at ambient temperature there is allowed to flow a latex mixture containing 100 g. of a vinyl acetate-ethylene copolymer the vinyl acetate content of which is 93% by weight and the K value of which measured in cyclohexanone at 20° C. is 120 and 90 g. of a polyvinyl chloride. Then, there is introduced a latex containing 10 g. of a polystyrene. The resultant floccules are easily drained, washed and dried and the powder thus obtained does not conglomerate when it is stored.

EXAMPLE 20

This example is like Example 19 but a polymethyl methacrylate instead of the polystyrene is employed. The results are equally favorable.

EXAMPLE 21

Into the agitated coagulant solution at ambient temperature there is allowed to flow a latex mixture containing 150 g. of a vinyl acetate-ethylene copolymer the vinyl acetate content of which is 67% by weight and the K value of which measured in cyclohexanone at 20° C. is 90 and 40 g. of a polyvinyl chloride. Then, after coagulation of this mixture, there is introduced a latex containing 0.95 g. of a polyvinyl chloride. When the resultant suspension of floccules is drained, the floccules remain quite powdery and can be washed and drained without difficulty. The resultant fine powder may be stored without any conglomeration occurring.

EXAMPLE 22

This example is like Example 21 but a quantity of the polyvinyl chloride latex containing only 0.20 g. of the polyvinyl chloride is introduced. This time the floccules formed are adhesive and conglomerate at the time of draining.

EXAMPLE 23

Into the agitated coagulant solution at 70° C. there is allowed to flow a latex containing 2,000 g. of a copolymer constituted of 36% by weight of butadiene and 64% by weight of methyl methacrylate, sold by Imperial Chemical Industries, Ltd. under the trade name Butakon ML 501. Upon contact with the electrolyte, the latex coagulates into fluoccules. The resultant suspension is cooled to 25° C., drained and the floccules washed with water. The product is then dried in a ventilated drying-oven at 50° C. Upon drying, the floccules conglomerate into a mass.

EXAMPLE 24

Into the agitated coagulant solution at 70° C. there is allowed to flow a latex containing 1800 g. of the same copolymer as in Example 23. Into the resultant suspension of floccules of the copolymer is introduced a latex containing 200 g. of a polyvinyl chloride. Again coagulation occurs and the temperature of this suspension is raised to 90° C. and maintained at that level for 30 minutes. The suspension is then cooled to 25° C., drained and the floccules washed with water. The solid product thus obtained is dried in a ventilated drying-oven at 50° C. The resultant product contains 900 g. of the copolymer per kg. of the product and is a fine powder which flows freely and does not conglomerate when stored.

EXAMPLE 25

Into the agitated coagulant solution at 70° C. there is allowed to flow a latex containing 1800 g. of the same copolymer as in Examples 23 and 24. Into the resultant suspension of floccules of the polymer there is introduced a latex containing 200 g. of a polymethyl methacrylate whereupon a second coagulation occurs. The temperature of the resultant suspension is raised to 90° C. and maintained at that level for 30 minutes. Then, this suspension is lowered to 25° C., drained and the floccules are washed with water. The product is then dried in a ventilated drying oven at 50° C. The product thus obtained contains 900 g. of the copolymer per kg. of the product and is a free-flowing fine powder which does not conglomerate upon storage.

EXAMPLE 26

Into the agitated coagulant solution at 70° C. there is allowed to flow a latex mixture containing 1200 g. of the same copolymer as employed in Examples 23 to 25 and 800 g. of a polyvinyl chloride. The resultant suspension is cooled to 25° C., drained and the floccules are washed with water. The product is then dried in a ventilated drying-oven at 50° C. After a certain period of storage, the product conglomerates into a mass.

EXAMPLE 27

Into the agitated coagulant solution at 70° C. there is allowed to flow a latex mixture containing 1200 g. of the same copolymer as in Example 23 and 700 g. of a polyvinyl chloride. To the resultant suspension of floccules there is added a latex containing 100 g. of a polyvinyl chloride. A second coagulation occurs and the temperature of the suspension is raised to 90° C. and maintained at that level for 30 minutes. The suspension is then cooled to ambient temperature, drained and the floccules are washed and dried. The resultant product contains 600 g. of the copolymer per kg. of the product and is a fine powder which does not conglomerate when stored.

EXAMPLE 28

This example is like Example 27 but the initial latex contains 790 g. of the polyvinyl chloride and the latex which is added after the first coagulation contains 10 g. rather than 100 g. of polyvinyl chloride. The results are favorable in this case also.

EXAMPLE 29

This example is like Example 27 except that the initial latex contains 792 g. of the polyvinyl chloride and the amount of the latex introduced in the second stage is such that the latex contains 8 g. of polyvinyl chloride. The dry product ultimately obtained conglomerates into a mass during storage.

EXAMPLE 30

Into the agitated coagulant solution at 70° C. there is allowed to flow a latex containing 2000 g. of a copolymer constituted of 62% by weight of butadiene and 38% by weight of styrene, sold under the trade name Hycar 2550 H5. After coagulation, the suspension of floccules thus obtained is cooled to 25° C. Then the suspension is dried and the floccules washed. During the drying in a ventilated drying-oven at 50° C., the product conglomerates into a mass.

EXAMPLE 31

Into the agitated coagulant solution was 70° C. there is allowed to flow 1800 g. of the copolymer employed in Example 30. Coagulation occurs and to the suspension of floccules thus obtained is added a latex containing 200 g. of a polyvinyl chloride, and a second coagulation occurs. The temperature is maintained at 70° C. for 30 minutes. Then, the suspension is cooled 25° C., drained and the floccules are washed with water and dried. The product thus obtained contains 900 g. of the copolymer per kg. of the product and is a powder which does not conglomerate in storage.

EXAMPLE 32

This example is like Example 31 but the second latex employed is of polystyrene rather than polyvinyl chloride. The results are identical.

EXAMPLE 33

Into the agitated coagulant solution at 70° C. there is allowed to flow a latex containing 1200 g. of the copolymer employed in Example 30 and 800 g. of a polyvinyl chloride. The resultant suspension of floccules is cooled to 25° C., drained and the floccules washed and dried in a ventilated drying-oven at 50° C. During storage, the resultant product conglomerates into a mass.

EXAMPLE 34

Into the agitated coagulant at 70° C. there is allowed to flow a latex containing 1200 g. of the copolymer employed in Example 30 and 700 g. of a polyvinyl chloride. To the resultant suspension of floccules is added a latex containing 100 g. of a polyvinyl chloride and a second coagulation occurs. The temperature is maintained at 70° C. for 30 minutes. The suspension is drained, the floccules washed and dried and the resultant powder contains 600 g. of copolymer per kg. of the powder product and does not conglomerate when stored.

EXAMPLE 35

Into the agitated coagulant solution at 70° C. there is allowed to flow a latex containing 1800 g. of a neoprene (poly(2-chlorobutadiene)) and 200 g. of a polyvinyl chloride. The vessel containing the coagulant solution is equipped with a milling apparatus and as the latex coagulates the coagulate is crushed into small particles which remain in suspension. The suspension is cooled to 25° C., drained and the coagulate particles washed with water and dried in a ventilated drying-oven at 50° C. The particles conglomerate into a mass during the drying.

EXAMPLE 36

The initial coagulation is conducted as in Example 35 but the solid material of the initial latex is constituted only of 1800 g. of neoprene. After the coagulation of this latex, there is introduced into the suspension a latex containing 200 g. of a polyvinyl chloride. A second coagulation occurs and then the temperature of the suspension is raised to 90° C. and maintained on that level for 30 minutes. The suspension is then cooled, drained and the product dried. The dry product is a powder containing 900 g. of the neoprene per kg. of the product and does not conglomerate in storage.

EXAMPLE 37

This example is like Example 35 but the latex contains 1500 g. of the neoprene and 500 g. of the polyvinyl chloride. The coagulate particles conglomerate at the time of drying.

EXAMPLE 38

This example is like Example 36 but the initial latex contains 1500 g. of the neoprene and 300 g. of a polyvinyl chloride. The final product contains 750 g. of the neoprene per kg. of the product and is a powder which does not conglomerate upon storage.

EXAMPLE 39

This example is like Example 35 but the latex contains 1200 g. of the neoprene and 800 g. of the polyvinyl chloride. The final product conglomerates into a mass during storage.

EXAMPLE 40

This example is like Example 36 but the initial latex contains 1200 g. of the neoprene and 700 g. of a polyvinyl chloride and the amount of the second latex added is an amount which contains 100 g. of the polyvinyl chloride. The final product is a powder which does not conglomerate in storage.

While the invention has been described by reference to particular embodiments thereof, it is to be understood that those embodiments are intended only to illustrate and not to limit the invention.

What we claim and desire to secure by Letters Patent is:

1. Method of obtaining an elastomer-based solid product in the form of a dry, non-adhesive powder which does not conglomerate when stored, comprising introducing into a coagulant for the latex, while agitating the coagulant, a latex the solid material of which contains from 30 to 100% by weight of elastomer, the balance of said solid material being constituted of non-elastomeric polymer, whereby said solid material forms a coagulate, then adding to the coagulate, while agitating the coagulate, a latex containing 0.5 to 25% by weight, based on the weight of said solid material in the thus-coagulated latex, of a hard polymer, selected from the group consisting of polyvinyl chloride, polystyrene and polymethyl methacrylate whereby the hard polymer coagulates onto the aforementioned coagulate, then separating the solid product thereby obtained from the aqueous phase and washing and drying the solid product.

2. Method according to claim 1, in which the elastomer of the solid material of the first-coagulated latex is of the group consisting of vinyl acetate-ethylene copolymers containing 45 to 95% by weight of vinyl acetate, butadiene homopolymer, copolymers of butadiene with one or more monomers of the group consisting of methyl methacrylate, styrene and a acrylonitrile, and polymers of substituted butadienes.

3. Method according to claim 2, in which the substituted butadienes are of the group consisting of isoprene and chlorobutadienes.

4. Method according to claim 1, in which the solid material of the first-coagulated latex includes up to 70% by weight of polyvinyl chloride.

References Cited

UNITED STATES PATENTS

| | | | |
|---|---|---|---|
| 3,297,600 | 1/1967 | Blair et al. | 260—892 |
| 3,049,501 | 8/1962 | Howland et al. | 260—29.7 X |
| 3,049,502 | 8/1962 | Howland et al. | 260—29.7 X |
| 3,058,926 | 10/1962 | Eichorn | 117—100 X |
| 3,154,604 | 10/1964 | McMillan | 117—100 X |
| 3,208,965 | 9/1965 | Kuhne | 117—100 X |
| 3,345,430 | 10/1967 | Simon et al. | 260—29.7 X |

FOREIGN PATENTS 242,260  4/1960  Australia.

WILLIAM D. MARTIN, Primary Examiner

MATHEW R. P. PERRONE, JR., Assistant Examiner

U.S. Cl. X.R.

117—138.8; 260—29.6, 29.7, 887, 890, 891, 892, 897